United States Patent Office 3,313,696
Patented Apr. 11, 1967

3,313,696
CARBAMATE SEDATIVE COMPOSITIONS AND METHOD OF USE
Charles D. Bossinger, Kankakee, and Kelley G. Taylor, Decatur, Ill., assignors to Armour Pharmaceutical Company, Chicago, Ill., a corporation of Delaware
No Drawing. Original application June 26, 1962, Ser. No. 205,201. Divided and this application Aug. 24, 1964, Ser. No. 391,769
9 Claims. (Cl. 167—65)

This invention relates to sedative compositions and to a method of treating the central nervous system of animals, i.e., mammals and fowls, especially man and domestic animals by administering these compositions to those animals.

This application is a divisional application from copending application Ser. No. 205,201, filed June 26, 1962 which is continuation-in-part of copending application Ser. No. 729,554, filed Apr. 21, 1958 and of Ser. No. 38,763, filed June 27, 1960. Application Ser. No. 38,763 was a continuation-in-part of application Ser. No. 729,553, filed Apr. 21, 1958, and applications Ser. Nos. 729,553 and 729,554 were continuations-in-part of parent application Ser. No. 554,132, filed Dec. 20, 1955. Applications Ser. Nos. 554,132, 729,553, 38,763 and 205,201 are now abandoned.

It is an object of this invention to provide carbamate compounds for use in treating the central nervous system which function primarily as short-acting sedatives. Another related object is to provide carbamate compounds which exhibit a marked sedative action with a minimum of tranquilization and muscle relaxation. Further objects and advantages will be indicated in the following detailed specification.

The hydroxy phenyl alkyl carbamate compounds which are useful in the treatment of the central nervous system in accordance with the present invention all contain a secondary alcohol group and are characterized by the following structural formula:

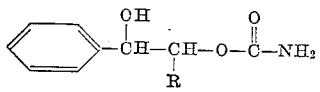

In the foregoing formula, R is an alkyl group containing from 1 to 2 carbon atoms. Specific examples of such compounds are 1-hydroxy-1-phenyl butyl-2-carbamate, and 1-hydroxy-1-phenyl propyl-2-carbamate. The preferred compound for use as a short-acting sedative in accordance with the present invention is 1-hydroxy-1-phenyl butyl-2-carbamate.

The foregoing carbamate compounds can be prepared by the process described in copending application Ser. No. 816,700, filed May 29, 1959, now U.S. Patent No. 3,066,164. In the process as described therein, a 1,2-glycol is converted to the corresponding carbonate, and the carbonate is subjected to ammonolysis to obtain the desired carbamate. Preferably, 1,2-glycol is condensed with a halo-formic ester to obtain an acyclic carbonate which is then subjected to ammonolysis to obtain the monocarbamate. Since the particular process for preparing the carbamate compounds does not form a part of the present invention, it is not believed it will be necessary to further describe such processes herein, except as illustrated by the following examples.

In utilizing the compounds of this invention for central nervous system treatment and particularly for use as short-acting sedatives, it is preferred to administer the compounds orally. Since the compounds are well-absorbed orally, it will usually not be necessary to resort to parenteral administration. For oral administration, it is preferred to combine the carbamate compound with a pharmaceutical carrier. The proportions of the carrier and carbamate compound are not critical, and they can vary considerably depending on whether the composition is to be filled into capsules or formed into tablets. In tableting, it will usually be desirable to employ at least as much of the pharmaceutical carrier as the carbamate compound. Various edible carriers, or mixtures thereof can be used. For example, a mixture of lactose, dibasic calcium phosphate, and cornstarch is suitable. Additional ingredients can be included, such as lubricants like magnesium stearate.

When administering the compounds of this invention orally, the total daily dose will usually fall within the range from 400 to 2,400 milligrams of the carbamate compound per 24 hour period. Typically, the daily dose will range from 600 to 1,600 milligrams. In practicing the method of this invention, it will therefore be convenient to have the carbamate compound combined with a pharmaceutical carrier, such as lactose or dibasic calcium phosphate, and prepared in tablets or other dosage unit form. Each tablet or dosage unit can contain from 50 to 600 milligrams of the carbamate compound. For example, tablets containing 200 milligrams of the carbamate compound can be administered one tablet three times a day to achieve a daily dose of 600 milligrams, or up to 2 tablets four times a day to achieve a daily dose of 1,600 milligrams.

The present invention is further illustrated by the following specific examples.

EXAMPLE 1

A 500 ml. three-necked flask fitted with an addition funnel, a mechanical stirrer, and a drying tube, was charged with 33.2 g. of 1-phenyl-1,2-butanediol (0.2 mole), 16.2 g. of pyridine (.205 mole) and 150 ml. of benzene. The flask was immersed in an ice bath. Ethyl chlorocarbonate 22.2 g. (.205 mole) was added dropwise in a period of 30 minutes. The reaction mixture was then stirred at room temperature for another two and one-half hours and left standing overnight.

100 ml. water was added to dissolve the pyridine hydrochloride formed. The benzene layer was separated, washed with water once, cold dilute hydrochloric acid twice, saturated NaHCO₃ solution twice, and ice water once. It was then poured into 150 ml. of concentrated ammonium hydroxide at 0°. The reaction mixture was stirred at 0° for 2 hours. After the benzene layer was separated, all the volatile material evaporated, a light yellow viscous oil, 40.5 g. was obtained. The crude product was purified via column chromatography using alumina as the absorbent. Benzene and ether were used as the eluents. An orange viscous oil, 15.5 g., was isolated from the benzene fraction and a semi-solid, 22.4 g., was isolated from the ether fraction. The semi-solid was triturated with CCl₄ to give crude P336, 9.9 g. It was recrystallized from CCl₄ to white crystals, 7.3 g., M.P. 94.5–96°, of 1-hydroxyl-1-phenyl butyl 2-carbamate.

EXAMPLE 2

1-phenyl-1,2-propylene glycol, 15.2 g. (0.1 mole), was heated at reflux with diethyl carbonate, 11.8 g. (0.1 mole), and 50 mg. potassium carbonate. A Vigreux column was used to fractionate the ethanol formed. Heating was continued until temperature dropped at head (3 hours). The cyclic carbonate was then distilled under vacuo, B.P. 150–152°/2 mm., 13.1 g., a 74% yield.

The cyclic carbonate was stirred with 75 mm. of concentrated ammonium hydroxide until all went into solution (one-half hour). After this, stirring was continued for one-half hour, the solvent was stripped off. The residue was azeotroped with benzene and recrystallized from benzene recovering 8.4 g., 43% based on glycol.

The carbamate was purified by hydrogenation using Pd on carbon as the catalyst. Hydrogenation of 27 g. of carbamate was carried out in methanol using 10 g. of 5% Pd on carbon catalyst at 45 lbs. H₂ pressure. After a 1.5 lb. pressure drop, the reaction mixture was filtered. The solvent was stripped, and the residue recrysallized from 500 ml. of benzene, recovering 18 g. of the carbamate, M.P. 101–102°, of 1-hydroxy-1-phenyl-2-propyl carbamate.

EXAMPLE 3

A 500 ml. three-necked flask fitted with an addition funnel, a mechanical stirrer, and a drying tube was charged with 30.4 g. of 1-phenyl-1,2-propanediol, 16.0 g. of pyridine, and 250 ml. of benzene. The flask was immersed in an ice bath. Ethyl chlorocarbonate, 21.8 g. was added dropwise in a period of three-fourths of an hour. The reaction mixture was then stirred at room temperature for 2 hours, washed with 50 ml. of water three times, and poured into 200 ml. of concentrated NH₄OH. The mixture was stirred overnight.

The benzene layer was separated and evaporated to dryness. The residue was extracted with acetone. After the acetone solution was evaporated, the residue was treated with 200 ml. of benzene. P307, the isomeric carbamate, 4.5 g., M.P. 119–121° was isolated by filtration. The filtrate was concentrated and sent through an alumina column (750 g.). Benzene, acetone, and methanol were used as the eluents. From 1 liter of acetone, 15 g. of product was isolated. Vacuum distillation gave two fractions. The high boiling fraction was the desired product, 1-hydroxy-1-phenyl-2-propyl carbamate. It was redistilled to give an oil, 7.0 g., B.P. 157–161°/0.4 mm.

EXAMPLE 4

Tablets for oral administration were prepared from 1-hydroxy-1-phenyl butyl-2-carbamate. This compound was combined with a mixed pharmaceutical carrier in the ratio of 2 parts by weight of the carbamate compound per 3 parts of the pharmaceutical carrier. The mixed carrier contained dibasic calcium phosphate as the principal ingredient together with smaller amounts of lactose and 1 part of cornstarch. A small amount of magnesium stearate was also included.

The carbamate compound, the calcium phosphate, the lactose, and part of the magnesium stearate were blended and dry mixed until a uniform composition was obtained. This was formed into firm slugs no greater than ¼ inch thick. The slugs were then put through an oscillating granulator equipped with a 10 mesh screen. The cornstarch and a little more magnesium stearate were added at intervals while the slugs were being sized. The granulation was blended in a drum tumbler for 30 minutes. Following this, the granulation was compressed into tablets of 500 mg. per tablet containing 200 milligrams of the carbamate compound.

While in the foregoing specification this invention has been described in relation to certain preferred embodiments and many details have been set forth for purpose of illustration, it will be apparent to those skilled in the art that the invention is susceptible to additional embodiments, and that certain of the details set forth herein can be varied considerably without departing from the basic principles of the invention.

We claim:

1. A composition in dosage unit form for use as a short-acting sedative, comprising about 50 to 600 milligrams of a hydroxy phenyl alkyl carbamate compound in admixture with a pharmaceutical carrier, said compound containing a secondary alcohol group and having the structural formula

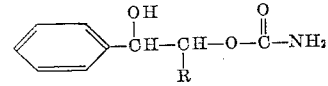

wherein R is alkyl containing from 1 to 2 carbon atoms.

2. The composition of claim 1 wherein said compound is 1-hydroxy-1-phenyl butyl-2-carbamate.

3. The composition of claim 1 wherein said compound is 1-hydroxy-1-phenyl propyl-2-carbamate.

4. The method of treating the central nervous system of an animal to obtain a sedative action therein, comprising orally administering to said animal a hydroxy phenyl alkyl carbamate compound containing a secondary alcohol group and having the structural formula

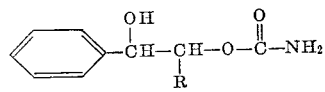

wherein R is alkyl containing from 1 to 2 carbon atoms.

5. The method of claim 4 wherein said compound is 1-hydroxy-1-phenyl butyl-2-carbamate.

6. The method of claim 4 wherein said compound is 1-hydroxy-1-phenyl propyl-2-carbamate.

7. The method of treating the central nervous system of an animal to obtain a sedative action therein, comprising orally administering to said animals from 400 to 2,400 milligrams per 24 hour period of a hydroxy phenyl alkyl carbamate compound containing a secondary alcohol group and having the structural formula

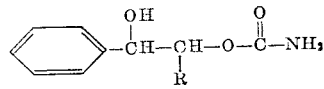

wherein R is alkyl containing from 1 to 2 carbon atoms.

8. The method of claim 7 wherein said compound is 1-hydroxy-1-phenyl butyl-2-carbamate.

9. The method of claim 7 wherein said compound is 1-hydroxy-1-phenyl propyl-2-carbamate.

References Cited by the Examiner

UNITED STATES PATENTS

| | | | |
|---|---|---|---|
| 2,627,524 | 2/1953 | Malkemus | 260—482 |
| 2,656,378 | 10/1953 | Berger et al. | 260—482 |
| 2,724,720 | 11/1955 | Berger et al. | 260—482 |
| 3,144,389 | 8/1964 | Bossinger | 167—65 |

OTHER REFERENCES

Berger, J. Pharm. and Exp. Ther. 104, page 230, 1952.

ALBERT T. MEYERS, *Primary Examiner.*

SAM ROSEN, *Examiner.*